(12) United States Patent
Goel (10) Patent No.: US 12,245,192 B2
(45) Date of Patent: Mar. 4, 2025

(54) METHODS, SYSTEMS, AND COMPUTER READABLE MEDIA FOR AVOIDING SENDING OF DUPLICATE NOTIFICATIONS FOR OVERLAPPING SUBSCRIPTIONS AT NETWORK FUNCTION (NF) REPOSITORY FUNCTION (NRF)

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 394 days.

(21) Appl. No.: 17/888,022

(22) Filed: Aug. 15, 2022

(65) Prior Publication Data

US 2024/0057033 A1 Feb. 15, 2024

(51) Int. Cl.
*H04W 68/02* (2009.01)
*H04W 8/18* (2009.01)

(52) U.S. Cl.
CPC .............. *H04W 68/02* (2013.01); *H04W 8/18* (2013.01)

(58) Field of Classification Search
CPC ..... H04W 68/02; H04W 8/18; H04W 68/005; H04L 67/30; H04L 67/51; H04L 67/55; H04L 61/4541
USPC ......................................................... 455/458
See application file for complete search history.

(56) References Cited

U.S. PATENT DOCUMENTS

| 11,936,752 B2 | 3/2024 | Krishan et al. |
| 2012/0197990 A1 | 8/2012 | Li et al. |
| 2019/0058681 A1* | 2/2019 | Ruiz-Meraz .......... H04L 51/214 |
| 2021/0250172 A1 | 8/2021 | Choyi et al. |
| 2022/0060367 A1 | 2/2022 | Khare et al. |
| 2022/0393971 A1 | 12/2022 | Bartolome Rodrigo et al. |
| 2023/0353657 A1 | 11/2023 | Krishan et al. |
| 2024/0049060 A1* | 2/2024 | Narasimham ......... H04W 28/24 |

(Continued)

FOREIGN PATENT DOCUMENTS

CN 113162956 A 7/2021

OTHER PUBLICATIONS

Notice of Allowance for U.S. Appl. No. 17/732,368 (Dec. 21, 2023).

(Continued)

*Primary Examiner* — Don N Vo
(74) *Attorney, Agent, or Firm* — Jenkins, Taylor & Hunt, P.A.

(57) ABSTRACT

A method for avoiding sending duplicate notifications for overlapping subscriptions includes, at a network function (NF) repository function (NRF), detecting an event relating to an NF. The method further includes identifying a plurality of subscriptions having a subscription condition corresponding to the event. The method further includes generating a list of the plurality of subscriptions having a subscription condition corresponding to the event. The method further includes iterating through the list of subscriptions and identifying overlapping subscriptions. The method further includes removing the overlapping subscriptions from the list. The method further includes sending notification messages to NFs corresponding to subscriptions remaining in the list.

20 Claims, 9 Drawing Sheets

(56) References Cited

U.S. PATENT DOCUMENTS

2024/0250883 A1* 7/2024 Pancorbo Marcos ... H04L 67/55

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).

"3rd Generation Partnership Project; Technical Specification Group Core Network and Terminals; 5G System; Network Function Repository Services; Stage 3 (Release 17)," 3GPP TS 29.510, V17.5.0 pp. 1-298 (Mar. 2022).

Fielding et al., "Hypertext Transfer Protocol (HTTP/1.1): Message Syntax and Routing," Internet Engineering Task Force (IETF), Request for Comments: 7230, pp. 1-89 (Jun. 2014).

Commonly-Assigned, co-pending U.S. Appl. No. 17/732,368 for "Methods, Systems, and Computer Readable Media for Generating and Processing Bundled Notification Request Messages" (Unpublished, filed Apr. 28, 2022).

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

"3rd Generation Partnership Project; Technical Specification Group Services and System Aspects; System architecture for the 5G System (5GS); Stage 2 (Release 17)," 3GPP TS 23.501, V17.5.0, pp. 1-568 (Jun. 2022).

* cited by examiner

METHODS, SYSTEMS, AND COMPUTER READABLE MEDIA FOR AVOIDING SENDING OF DUPLICATE NOTIFICATIONS FOR OVERLAPPING SUBSCRIPTIONS AT NETWORK FUNCTION (NF) REPOSITORY FUNCTION (NRF)

TECHNICAL FIELD

The subject matter described herein relates to managing subscriptions at an NRF. More particularly, the subject matter described herein relates to methods, systems, and computer readable media for avoiding sending of duplicate notifications for overlapping subscriptions at the NRF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other types of networks is that subscriptions managed by the NRF can result in duplicate notification messages being sent to the same consumer NF. For example, as per 3GPP TS 29,510, consumer NFs may subscribe to be notified when an NF instance or a collection of NF instances of a given NF type (based on subscription conditions as per 3GPP TS 29.510 Section 6.1.6.2.35 Type: subscrCond) undergo NF Registration/Update/Deregistration.

Two types of subscriptions that can result in duplicate notification messages sent to the same consumer NF are exact duplicate subscriptions and disguised duplicate subscriptions. These types of overlapping subscriptions can be defined as follows:

Exact duplicate subscriptions: An exact duplicate subscription is a subscription with exactly the same conditions and nfStatusNotificationUri as another subscription. An exact duplicate subscription can be created when the NRF receives a subscription creation request from a consumer NF and later receives the same subscription creation request from the same consumer NF. The NRF does not have the capability to determine whether the subscription has already been created based on matching following two attributes defined in in 3GPP TS 29.510 Section 6.1.6.2.16 Type: SubscriptionData:

Subscription Condition (again defined in 3GPP TS 29.510)

nfStatusNotificationUri

Disguised duplicate subscriptions: A disguised duplicate subscription is a subscription that is not an exact duplicate of another subscription but whose conditions overlap with the conditions of another subscription such that in some cases, a duplicate notification will occur. For example, a consumer NF may register a subscription to receive notification when an event occurs for an NF set and subsequently register to receive notification when an event occurs for an NF instance within the same NF set. The two subscriptions are not exact duplicates, but if an event occurs regarding the NF instance, the result will be two notification messages generated and sent to the same subscribing NF instance with exactly the same information. Such duplicate notifications should be avoided.

In another example, a subscribing NF may subscribe for an NF-type-based subscription and later subscribe to an NF Instance Id matching the NF type already subscribed to or vice-versa. The NRF does not have the capability to identify and consolidate duplicate subscriptions at subscription creation time. Because of this limitation, the NRF has no options but to create these overlapping subscriptions and generate the resulting duplicate notifications when an event matching the subscription conditions for both subscriptions occurs. The term "overlapping subscriptions", as used herein, is intended to include exact duplicate subscriptions and disguised duplicate subscriptions.

Challenges with overlapping subscriptions include the generation of duplicate notifications. Duplicate notifications are unnecessary traffic, since one notification per event is sufficient for the NRF to communicate an event concerning an NF or an NF set to a subscribing NF.

Accordingly, in light of these and other difficulties, there exists a need for improved methods, systems, and computer readable media for avoiding sending of duplicate notifications for overlapping subscriptions at the NRF.

SUMMARY

A method for avoiding sending duplicate notifications for overlapping subscriptions includes, at a network function (NF) repository function (NRF), detecting an event relating to an NF. The method further includes identifying a plurality of subscriptions having a subscription condition corresponding to the event. The method further includes generating a list of the plurality of subscriptions having a subscription condition corresponding to the event. The method further includes iterating through the list of subscriptions and identifying overlapping subscriptions. The method further includes removing the overlapping subscriptions from the list. The method further includes sending notification messages to NFs corresponding to subscriptions remaining in the list.

According to another aspect of the subject matter described herein, detecting an event includes detecting an NFRegister, an NFDeregister, or NFUpdate service operation requested by the NF.

According to another aspect of the subject matter described herein, identifying the subscriptions having the subscription condition corresponding to the event includes comparing a subscrCond attribute value of a SubscriptionData object for each of the subscriptions to attribute values associated with the event.

According to another aspect of the subject matter described herein, the subscriptions were created by the NFs using an NFStatusSubscribe service operation.

According to another aspect of the subject matter described herein, identifying overlapping subscriptions includes identifying exact duplicate subscriptions.

According to another aspect of the subject matter described herein, identifying overlapping subscriptions includes identifying disguised duplicate subscriptions.

According to another aspect of the subject matter described herein, identifying overlapping subscriptions includes identifying subscriptions in the list having the same nfStatusNotificationUri attribute value.

According to another aspect of the subject matter described herein, removing the overlapping subscriptions from the list includes removing subscriptions from the list such that only a single entry per nfStatusNotificationUri attribute value remains in the list.

According to another aspect of the subject matter described herein, the list includes a first subscription with a subscrCond attribute value that identifies a target NF set and a second subscription with a subscrCond attribute value that identifies a target NF instance within the NF set, the first and second subscriptions include the same nfStatusNotificationUri, and removing the overlapping subscriptions from the list include removing one of the first and second subscriptions from the list.

According to another aspect of the subject matter described herein, the list includes a first subscription with a reqNotifEvents attribute value identifying an event and a second subscription without a reqNotifEvents attribute and concerning the same target NF as the first subscription, the first and second subscriptions include the same nfStatusNotificationUri, and removing overlapping subscriptions from the list includes removing one of the first and second subscriptions from the list.

According to another aspect of the subject matter described herein, a system for avoiding sending duplicate notifications for overlapping subscriptions is provided. The system includes a network function (NF) repository function (NRF) including at least one processor and a memory. The system further includes a subscription database stored in the memory. The system further includes a duplicate notification avoidance controller for detecting an event relating to an NF, identifying, from the subscription database, a plurality of subscriptions having a subscription condition corresponding to the event, generating a list of the plurality of subscriptions having a subscription condition corresponding to the event, iterating through the list of subscriptions and identifying overlapping subscriptions, removing the overlapping subscriptions from the list, and sending notification messages to NFs corresponding to subscriptions remaining in the list.

According to another aspect of the subject matter described herein, the duplicate notification avoidance controller is configured to detect the event in response to receiving a request from the NF for an NFRegister, an NFDeregister, or NFUpdate service operation.

According to another aspect of the subject matter described herein, the duplicate notification avoidance controller is configured to identify the subscriptions having the subscription condition corresponding to the event by comparing a subscrCond attribute value of a SubscriptionData object for each of the subscriptions to attribute values associated with the event.

According to another aspect of the subject matter described herein, the duplicate notification avoidance controller is configured to identify exact duplicate subscriptions.

According to another aspect of the subject matter described herein, the duplicate notification avoidance controller is configured to identify disguised duplicate subscriptions.

According to another aspect of the subject matter described herein, the duplicate notification avoidance controller is configured to identify overlapping subscriptions by identifying subscriptions in the list having the same nfStatusNotificationUri attribute value.

According to another aspect of the subject matter described herein, the duplicate notification avoidance controller is configured to remove the overlapping subscriptions from the list by removing subscriptions from the list such that only a single entry per nfStatusNotificationUri attribute value remains in the list.

According to another aspect of the subject matter described herein, the list includes a first subscription with a subscrCond attribute value that identifies a target NF set and a second subscription with a subscrCond attribute value that identifies a target NF instance within the NF set, the first and second subscriptions include the same nfStatusNotificationUri, and the duplicate notification avoidance controller is configured to remove one of the first and second subscriptions from the list.

According to another aspect of the subject matter described herein, the list includes a first subscription with a reqNotifEvents attribute value identifying an event and a second subscription without a reqNotifEvents attribute and concerning the same target NF as the first subscription, the first and second subscriptions include the same nfStatusNotificationUri, and the duplicate notification avoidance controller is configured to remove one of the first and second subscriptions from the list.

According to another aspect of the subject matter described herein, a non-transitory computer readable medium having stored thereon executable instructions that when executed by a processor of a computer control the computer to perform steps is provided. The steps are performed at a network function (NF) repository function (NRF). The steps include detecting an event relating to an NF. The steps further include identifying a plurality of subscriptions having a subscription condition corresponding to the event. The steps further include generating a list of the plurality of subscriptions having a subscription condition corresponding to the event. The steps further include iterating through the list of subscriptions and identifying overlapping subscriptions. The steps further include removing the overlapping subscriptions from the list. The steps further include sending notification messages to NFs corresponding to subscriptions remaining in the list.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
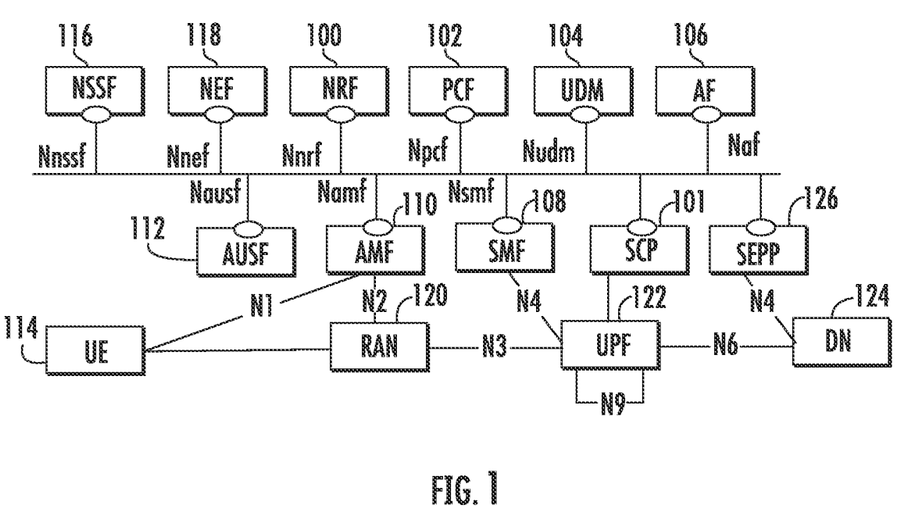
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. RAN 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
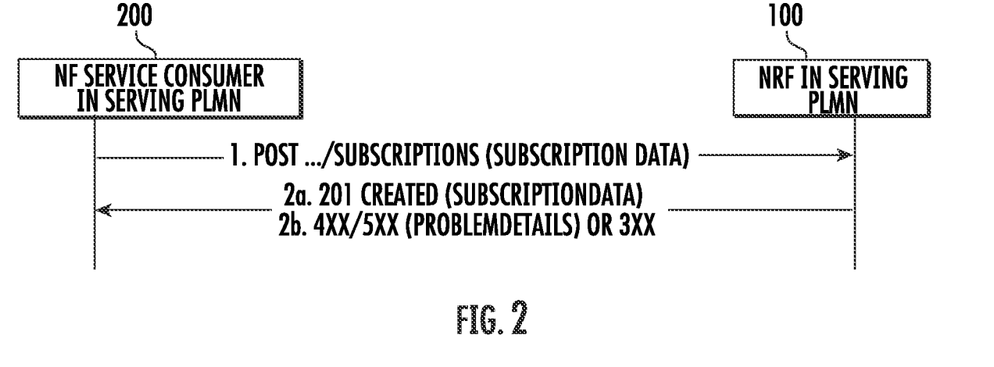
FIG. 2 is a message flow diagram illustrating exemplary messages exchanged in an NFStatusSubscribe service operation.

As stated above, one problem with the current NRF architecture is that there is no mechanism for the NRF to avoid sending duplicate notifications for overlapping subscriptions. Subscriptions are created at the NRF using the NFStatusSubscribe service operation defined in 3GPP TS 29.510. FIG. 2 is a message flow diagram illustrating exemplary messages exchanged in the NFStatusSubscribe service operation. Referring to FIG. 2, In line 1 of the message flow diagram, an NF service consumer 200 initiates the NFStatusSubscribe service operation by sending an HTTP POST message to NRF 100. The HTTP POST message contains subscription data used by NRF 100 to generate notifications. The subscription data can include information that indicates the target NF instance and/or NF set and the type of events for which notification is requested. The subscription data may also include a callback URI at which NF service consumer 200 is prepared to receive notifications from NRF 100.

NRF 100 receives the subscription creation request and stores the subscription data in a subscription database. When an event occurs, NRF 100 checks the subscription data in the subscription database against attributes associated with the event to determine whether to generate notification messages and where to send the notification messages.

If creation of the subscription is successful, NRF 100 responds as indicated in line 2a with a 201 Created message. The 201 Created message includes a subscription ID that consumer NF 200 can use to identify the subscription for subsequent modification or deletion requests. If creation of the subscription is not successful or if the request is redirected, NRF 100 responds as indicated in line 2b with a 4xx or 5xx message indicating problem details. If NRF 100 redirects the subscription request to another PLMN, NRF 100 responds with a 3xx message indicating redirection. It should be noted that while FIG. 2 illustrates the creation of a subscription by an NRF located in the same PLMN as the subscribing consumer NF, subscriptions can also be created between consumer NFs and NRFs in different PLMNs.

Figure 3:
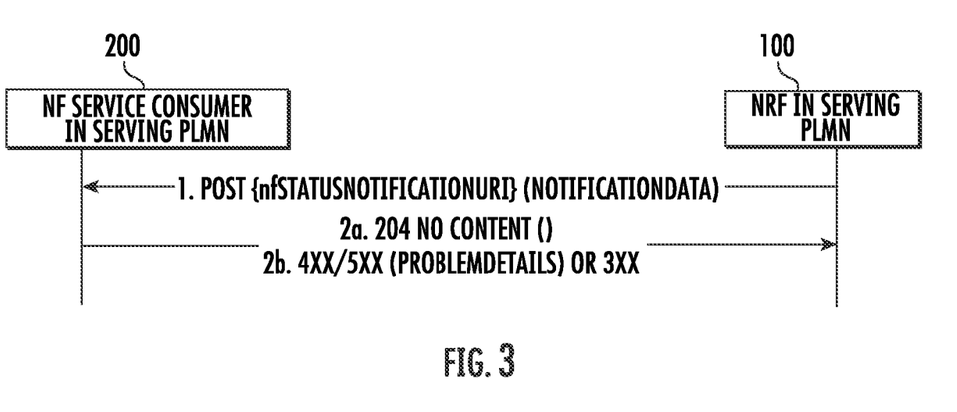
FIG. 3 is a message flow diagram illustrating exemplary messages exchanged in an NFStatusNotify service operation.

When NRF 100 detects an event, such as an NFRegister, NFUpdate, or NFDeregister event that corresponds to subscription conditions for one of the subscriptions created using the messaging illustrated in FIG. 2, NRF 100 performs the NFStatusNotify service operation to notify consumer NFs of the event. FIG. 3 is a message flow diagram illustrating exemplary messages exchanged in an NFStatusNotify service operation. Referring to FIG. 3, when NRF 100 detects that conditions associated with a subscription have been met, NRF 100 sends an HTTP POST request to the callback URI identified in the subscription conditions, as indicated by line 1 of the message flow diagram. The HTTP POST request may contain the NfInstance URI of the NF instance, an indication of the event being notified, and, if the event relates to a newly registered NF, NF profile data for the NF. Consumer NF 200 responds as indicated in line 2a with a 204 No Content message if the notification request is successful. If the notification request is not successful, consumer NF 200 responds as indicated in line 2b with a 4xx or 5xx message with problem details. If the notification request is redirected, consumer NF 200 responds with a 3xx message indicating redirection.

Figure 4:
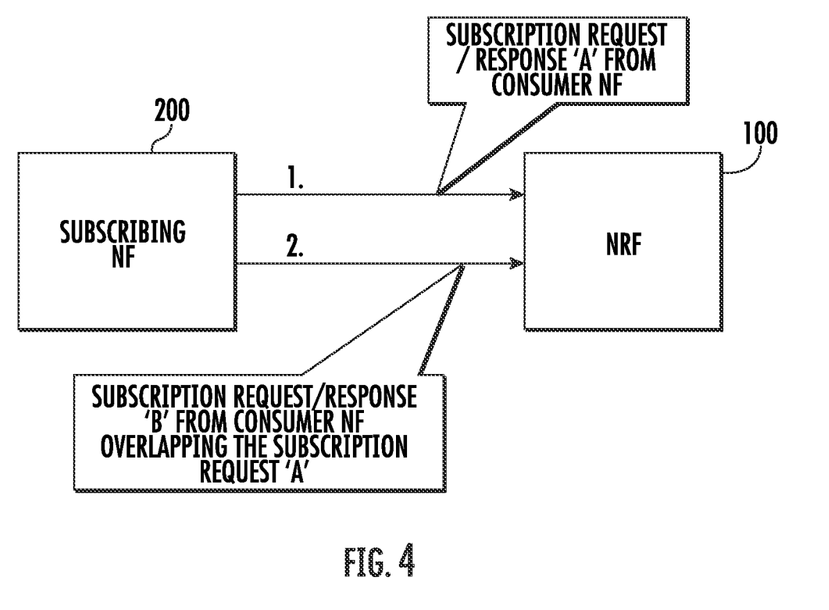
FIG. 4 is a message flow diagram illustrating the creation of overlapping subscriptions with the NRF.

One problem with the service operations illustrated in FIGS. 2 and 3 is that a consumer NF can intentionally or unintentionally create overlapping subscriptions and the NF may respond with duplicate notification messages when an event matches subscription conditions associated with more than one subscription. FIG. 4 is a message flow diagram illustrating the creation of overlapping subscriptions with the NRF. Referring to FIG. 4, in line 1 of the message flow diagram, consumer NF 200 sends a subscription request message to NRF 100. In one example, the subscription criteria in the subscription request may identify target NF set #1. In line 2 of the message flow diagram, NF service consumer 200 sends another subscription request to NRF 100. It is assumed that the subscription request includes subscription criteria that overlaps with the subscription criteria the subscription request in line 1. For example, the overlapping subscription request may include subscription criteria that identifies target NF instance #1a, where target NF instance #1a is a member of NF set #1 identified by the subscription request in line 1.

Figure 5:
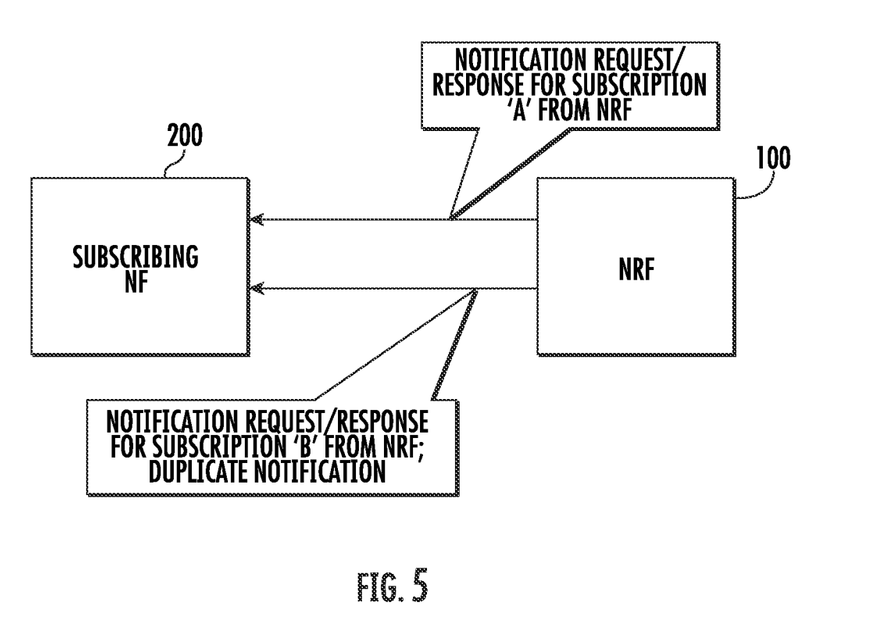
FIG. 5 is a message flow diagram illustrating duplicate notifications transmitted as a result of the overlapping subscriptions in FIG. 4.

The results of overlapping subscription requests are duplicate notifications, as illustrated by FIG. 5. In FIG. 5, it is assumed that NRF 100 detects an event matching the subscription data corresponding to both subscriptions created in FIG. 4. Because NRF 100 has no way to detect overlapping subscriptions or refrain from sending duplicate notifications, in line 1, NRF 100 sends a first notification request to consumer NF 200 and corresponding to the subscription created in line 1 of FIG. 4. In line 2 of FIG. 5, NRF 100 sends a second notification request to NF 200 and corresponding to the subscription created in line 2 of FIG. 4. The first notification request and the second notification request include identical content. For example, if an event is triggered by an NFUpdate request for NF instance #1a, the event will match the subscription data for the NF set created by the subscription in line 1 of FIG. 4 and the subscription data for the NF instance created for the NF instance in line 2 of FIG. 4.

To address this issue of overlapping subscriptions and duplicate notifications, an NRF as described herein is capable of analyzing subscription data when an event occurs, detecting overlapping subscriptions, and refraining from sending duplicate notifications for subscriptions identified as overlapping. For example, when processing an NF status change event (i.e., an NFRegister, NFDeregister, or NFUpdate event), the NRF will identify duplicate notifications by identifying duplicity in the nfStatusNotificationUri attribute value defined in 3GPP TS 29.510 Section 6.1.6.2.16 Type: SubscriptionData. Section 6.1.6.2.16 defines the nfStatusNotificationUri as follows:

| Attribute name | Data type | P | Cardinality | Description |
| --- | --- | --- | --- | --- |
| nfStatusNotificationUri | Uri | M | 1 | Callback URI where the NF Service Consumer will receive the notifications from NRF. |

As indicated in the table above, the nfStatusNotificationUri contains the callback URI where the NF service consumer receives notifications (for matching subscriptions) from the NRF. Overlapping subscriptions for with the same nfStatusNotificationUri should be identified when an event occurs to avoid sending duplicate notifications.

Overlapping subscriptions can be created by specifying overlapping attribute values in the SubscriptionData defined for a subscription for the same nfStatusNotificationUri. For example, the subscrCond attribute is defined as follows:

| Attribute Name | Data Type | P | Cardinality | Description |
| --- | --- | --- | --- | --- |
| subscrCond | SubscrCond | O | 0 . . . 1 | If present, this attributed shall contain the conditions identifying the set of NF |

-continued

| Attribute Name | Data Type | P | Cardinality | Description |
|---|---|---|---|---|
| | | | | Instances whose status is requested to be monitored. If this attribute is not present, it means that the NF Service Consumer requests a subscription to all NFs in the NRF (NOTE 1). |

As indicated in the table, the subscrCond attribute contains data that identifies conditions identifying the set of NF instances whose status is requested to be monitored. If the subscrCond attribute for one subscription identifies an NF instance, the subscrCond attribute for another subscription identifies an NF set of which the NF instance is a member, and the subscriptions identify the same nfStatusNotificationUri, the subscriptions are overlapping. When an event occurs concerning the NF instance, without the duplicate notification avoidance mechanism described herein, the NRF will send duplicate notifications to the nfStatusNotificationUri.

Rather than analyzing each subscription and consolidating the subscriptions, the NRF as described herein identifies duplicate subscriptions at the time that an event occurs by generating a list of subscriptions whose conditions are satisfied by an event, identifying overlapping subscriptions as those that have the same nfStatusNotificationUri, and removing overlapping subscriptions from the list. After overlapping subscriptions have been identified and removed from the list, the NRF sends only a single notification per subscribed nfStatusNotificationUri.

Figure 6:
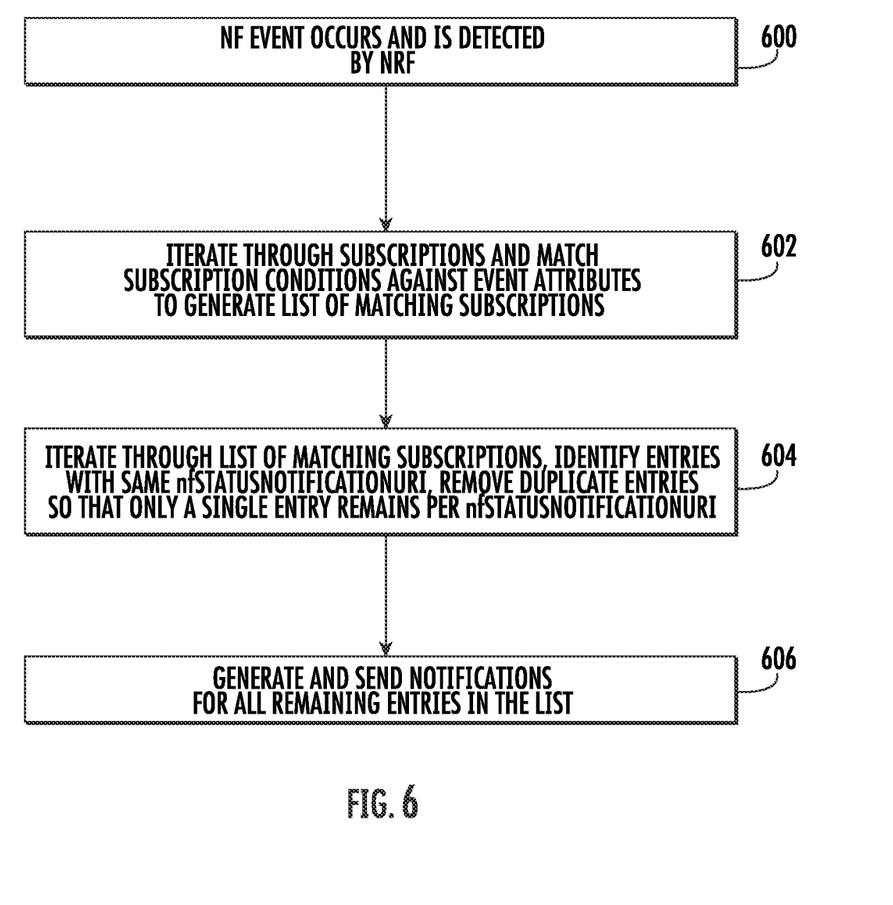
FIG. 6 is a flow chart illustrating exemplary steps performed by the NRF to avoid the sending of duplicate notifications for overlapping subscriptions.

FIG. 6 is a flow chart illustrating exemplary steps performed by the NRF to avoid the sending of duplicate notifications for overlapping subscriptions. Referring to FIG. 6, in step 600, the process includes detecting the occurrence of an NF event. The event may be an NFRegister service operation, an NFDeregister service operation, or an NFUpdate service operation affecting one or more NF instances. The NFRegister, NFUpdate, and NFDeregister service operations are defined in 3GPP TS 29.510 and involve the sending of an NFRegister, NFDeregister, or NFUpdate request message to the NRF. The NFRegister, NFDeregister, or NFUpdate request message includes attribute values that are used by the NRF to identify the NF profile of the NF instance or NF instances being registered, updated, or deregistered. The attribute values are also used by the NRF to determine whether the event matches the conditions associated with any subscriptions maintained by the NRF.

In step 602, the process includes iterating through all subscriptions managed by the NRF to match subscription conditions against the NF event. In this step, the NRF compares the SubscriptionData object attribute values to data associated with the event received in the request message from the producer NF that triggered the event. The result of step 602 is a list of subscriptions matching the event.

In step 604, the process includes iterating through the list prepared in step 602, identifying entries with the same nfStatusNotificationUri, and removing duplicate entries so that only a single entry remains per nfStatusNotificationUri.

In step 606, the process includes generating and sending notifications for all list entries remaining after step 604 is executed. Step 606 involves using the NFStatusNotify service operation illustrated in FIG. 3 to send an NFStatusNotify request message for each entry remaining in the list. Because duplicate entries were removed, only a single notification per nfStatusNotificationUri is sent. As a result, network traffic and unnecessary processing at the consumer NF corresponding to the nfStatusNotificationUri are reduced.

Figure 7:
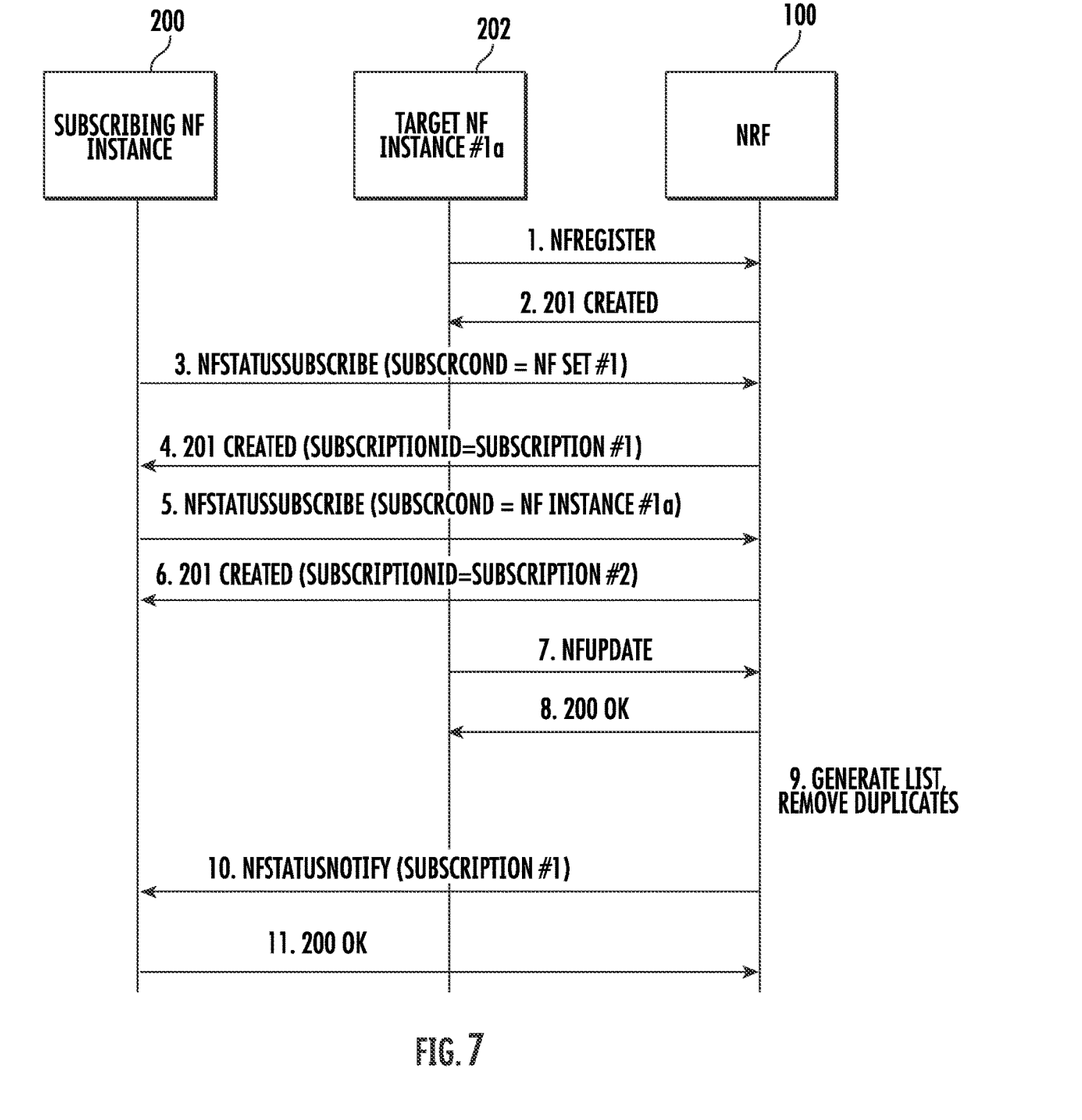
FIG. 7 is a message flow diagram illustrating an example of overlapping subscriptions and duplicate notification avoidance by the NRF.

FIG. 7 is a message flow diagram illustrating an example of overlapping subscriptions and duplicate notification avoidance by the NRF. Referring to FIG. 7, In step 1, a target NF instance #1a 202 registers its NF profile with NRF 100. In step 2, NRF 100 responds with a 201 Created message.

In step 3, subscribing NF instance 200 subscribes with NRF 100 to receive notification of all events concerning NF set #1 of which target NF instance #1a 202 is a member. In step 4, NRF 100 responds with a 201 Created message.

In step 5 of the message flow diagram, subscribing NF instance 200 sends another NFStatusSubscribe message to NRF 100 subscribing to receive notification of all events concerning NF instance #1a 202. In step 6, NRF 100 responds with a 201 Created message indicating that the second subscription has been created.

In step 7, target NF instance #1a 202 updates its NF profile with NRF 100 by sending an NFUpdate request message to NRF 100. In step 8, NRF 100 responds with a 200 OK message.

In step 9, NRF 100 determines that the NFUpdate event matches subscription conditions associated with subscription #1 and subscription #2 and generates a list of the matching subscriptions. The following table illustrates exemplary data that may be included in the list.

| Subscription ID | nfStatusNotificationUri |
|---|---|
| Subscription #1 | SubscribingNFInstance_200 |
| Subscription #2 | SubscribingNFInstance_200 |

In the table, it can be seen that entries in the list for two subscriptions, subscription #1 and subscription #2, have the same nfStatusNotificationUri attribute value. NRF 100 removes one of the entries from the list such that only a single entry exists with the same nfStatusNotificationUri. The following table illustrates the result of removing one of the entries from the list of matching subscriptions.

| Subscription ID | nfStatusNotificationUri |
|---|---|
| Subscription #1 | SubscribingNFInstance_200 |

After removing the duplicate entry from the list, NRF 100 sends an NFStatusNotify request message corresponding to the single subscription remaining in the list. In the illustrated example, in step 10, NRF 100 sends an NFStatusNotify request message concerning subscription #1 to subscribing NF instance 200. NRF 100 avoids sending the duplicate notification request message for subscription #2. In step 11, subscribing NF instance 200 responds with a 200 OK message.

Figure 8:
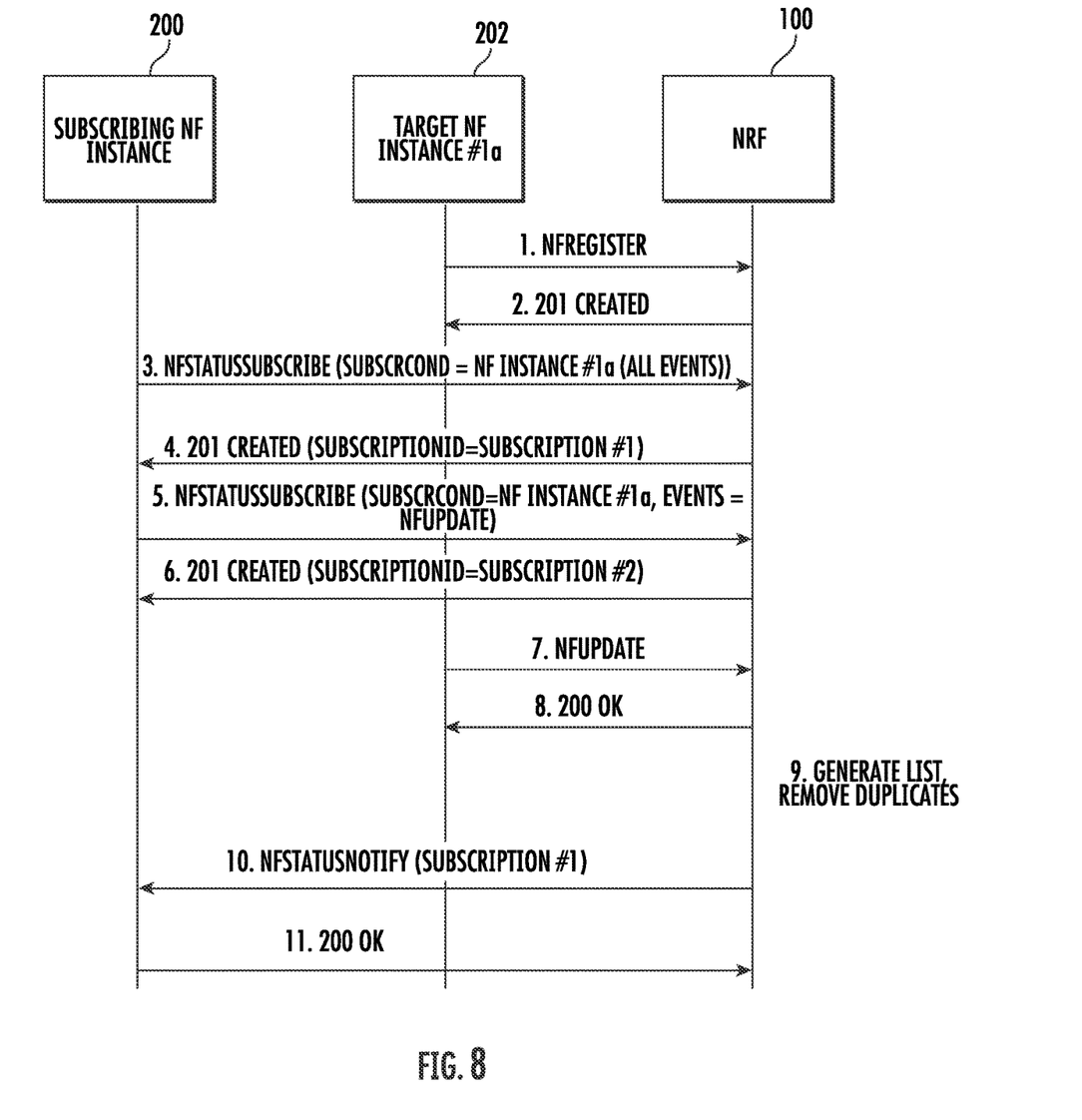
FIG. 8 is a message flow diagram illustrating another example of overlapping subscriptions and duplicate notification avoidance by the NRF.

FIG. 8 is a message flow diagram illustrating another example of overlapping subscriptions and duplicate notification avoidance by the NRF. Referring to FIG. 8, In step 1, a target NF instance #1a 202 registers its NF profile with NRF 100. In step 2, NRF 100 responds with a 201 Created message.

In step 3, a subscribing NF instance 200 subscribes with NRF 100 to receive notification of all events concerning target NF instance #1a 202. Subscribing NF instance 200 may subscribe to receive notification of all events concerning NF instance #1a 202 by specifying a subscrCond attribute value identifying target NF instance #1a 202 and no reqNotifEvents attribute. By not specifying a reqNotifEvents attribute, subscribing NF instance 202 subscribes to all events concerning target NF instance #1a 202 by default. In step 4, NRF 100 responds with a 201 Created message.

In step 5 of the message flow diagram, subscribing NF instance 200 sends another NFStatusSubscribe message to NRF 100 subscribing to receive all notification of NFUpdate events concerning NF instance #1a 202. NFUpdate events may be subscribed to by specifying a reqNotifEvents attribute value indicating NFUpdate. In step 6, NRF 100 responds with a 201 Created message indicating that the second subscription has been created.

In step 7, target NF instance #1a 202 updates its NF profile with NRF 100 by sending an NFUpdate request message to NRF 100. In step 8, NRF 100 responds with a 200 OK message.

In step 9, NRF 100 determines that the NFUpdate event matches subscription conditions associated with subscription #1 and subscription #2 and generates a list of the matching subscriptions. The following table illustrates exemplary data that may be included in the list.

| Subscription ID | nfStatusNotificationUri |
| --- | --- |
| Subscription #1 | SubscribingNFInstance_200 |
| Subscription #2 | SubscribingNFInstance_200 |

In the table, it can be seen that entries for two subscriptions, subscription #1 and subscription #2, have the same nfStatusNotificationUri attribute value. NRF 100 removes one of the entries from the table such that only a single entry exists with the same nfStatusNotificationUri. The following table illustrates the result of removing one of the entries from the list of matching subscriptions.

| Subscription ID | nfStatusNotificationUri |
| --- | --- |
| Subscription #1 | SubscribingNFInstance_200 |

After removing the duplicate entry from the list, NRF 100 sends an NFStatusNotify request message corresponding to the single subscription remaining in the list. In the illustrated example, in step 10, NRF 100 sends an NFStatusNotify request message concerning subscription #1 to subscribing NF instance 200. NRF 100 avoids sending the duplicate notification request message for subscription #2. In step 11, subscribing NF instance 200 responds with a 200 OK message.

Figure 9:
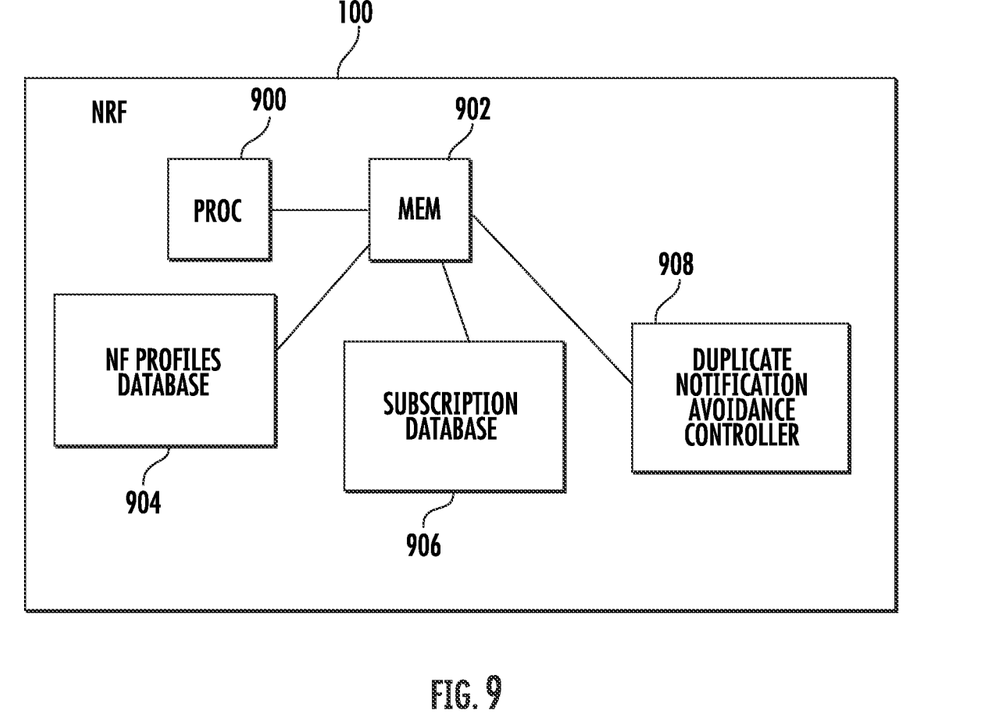
FIG. 9 is a block diagram illustrating an exemplary architecture for an NRF that avoids the sending of duplicate notifications for overlapping subscriptions.

FIG. 9 is a block diagram illustrating an exemplary architecture for an NRF that avoids the sending of duplicate notifications for overlapping subscriptions. Referring to FIG. 9, NRF 100 includes at least one processor 900 and a memory 902. NRF 100 further includes an NF profiles database 904 that stores the NF profiles of NFs that have registered with NRF 100. NRF 100 further includes a subscription database 906 that contains subscriptions that have been created by subscribing NFs within NRF 100. NF profiles database 904 and subscription database 906 may be stored in memory 902. NRF 100 further includes a duplicate notification avoidance controller 908 that performs the steps described herein for awarding sending of duplicate notification messages for overlapping subscriptions. Duplicate notification avoidance controller 908 may be implemented using computer executable instructions stored in memory 902 and executed by processor 900.

Exemplary advantages of the subject matter described herein include the avoidance of duplicate notification messages being sent over the network caused by overlapping subscriptions. Avoiding duplicate notification messages reduces network traffic and decreases the processing load on subscribing NFs. In addition, because the NRF is capable of avoiding unnecessary notification messages by generating the list of subscriptions matching an event and using the nfStatusNotificationUri value in the list of matching subscriptions to identify duplicates, processing at the NRF is also optimized. For example, the NRF can use existing subscription condition comparison logic to generate the list and iterate through the list using only the nfStatusNotificationUri to identify duplicates.

The disclosure of each of the following references is hereby incorporated herein by reference in its entirety.

REFERENCES

1. $3^{rd}$ Generation Partnership Project; Technical Specification Group Core Network and Terminals; 5G System; Network Function Repository Services; Stage 3 (Release 17) 3GPP TS 29.510 V17.6.0 (2022 June)'
2. $3^{rd}$ Generation Partnership Project; Technical Specification Group Services and System Aspects; System architecture for the 5G System (5GS); Stage 2; (Release 17) 3GPP TS 23.501 V17.5.0 (2022-06)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for avoiding sending duplicate notifications for overlapping subscriptions, the method comprising:
 at a network function (NF) repository function (NRF):
  detecting an event relating to an NF;
  identifying a plurality of subscriptions having a subscription condition corresponding to the event;
  generating a list of the plurality of subscriptions having a subscription condition corresponding to the event;
  iterating through the list of subscriptions and identifying overlapping subscriptions;
  removing the overlapping subscriptions from the list; and
  sending notification messages to NFs corresponding to subscriptions remaining in the list.

2. The method of claim 1 wherein detecting an event includes detecting an NFRegister, an NFDeregister, or NFUpdate service operation requested by the NF.

3. The method of claim 1 wherein identifying the subscriptions having the subscription condition corresponding to the event includes comparing a subscrCond attribute value of a SubscriptionData object for each of the subscriptions to attribute values associated with the event.

4. The method of claim 1 wherein the subscriptions were created by the NFs using an NFStatusSubscribe service operation.

5. The method of claim 1 wherein identifying overlapping subscriptions includes identifying exact duplicate subscriptions.

6. The method of claim 1 wherein identifying overlapping subscriptions includes identifying disguised duplicate subscriptions.

7. The method of claim 1 wherein identifying overlapping subscriptions includes identifying subscriptions in the list having the same nfStatusNotificationUri attribute value.

8. The method of claim 7 wherein removing the overlapping subscriptions from the list includes removing subscriptions from the list such that only a single entry per nfStatusNotificationUri attribute value remains in the list.

9. The method of claim 8 wherein the list includes a first subscription with a subscrCond attribute value that identifies a target NF set and a second subscription with a subscrCond attribute value that identifies a target NF instance within the NF set, the first and second subscriptions include the same nfStatusNotificationUri, and removing the overlapping subscriptions from the list include removing one of the first and second subscriptions from the list.

10. The method of claim 8 wherein the list includes a first subscription with a reqNotifEvents attribute value identifying an event and a second subscription without a reqNotifEvents attribute and concerning the same target NF as the first subscription, the first and second subscriptions include the same nfStatusNotificationUri, and removing overlapping subscriptions from the list includes removing one of the first and second subscriptions from the list.

11. A system for avoiding sending duplicate notifications for overlapping subscriptions, the system comprising:
   a network function (NF) repository function (NRF) including at least one processor and a memory;
   a subscription database stored in the memory;
   a duplicate notification avoidance controller for detecting an event relating to an NF, identifying, from the subscription database, a plurality of subscriptions having a subscription condition corresponding to the event, generating a list of the plurality of subscriptions having a subscription condition corresponding to the event, iterating through the list of subscriptions and identifying overlapping subscriptions, removing the overlapping subscriptions from the list, and sending notifications message to NFs corresponding to subscriptions remaining in the list.

12. The system of claim 11 wherein the duplicate notification avoidance controller is configured to detect the event in response to receiving a request from the NF for an NFRegister, an NFDeregister, or NFUpdate service operation.

13. The system of claim 11 wherein the duplicate notification avoidance controller is configured to identify the subscriptions having the subscription condition corresponding to the event by comparing a subscrCond attribute value of a SubscriptionData object for each of the subscriptions to attribute values associated with the event.

14. The system of claim 11 wherein the duplicate notification avoidance controller is configured to identify exact duplicate subscriptions.

15. The system of claim 11 wherein the duplicate notification avoidance controller is configured to identify disguised duplicate subscriptions.

16. The system of claim 11 wherein the duplicate notification avoidance controller is configured to identify overlapping subscriptions by identifying subscriptions in the list having the same nfStatusNotificationUri attribute value.

17. The system of claim 16 wherein the duplicate notification avoidance controller is configured to remove the overlapping subscriptions from the list by removing subscriptions from the list such that only a single entry per nfStatusNotificationUri attribute value remains in the list.

18. The system of claim 17 wherein the list includes a first subscription with a subscrCond attribute value that identifies a target NF set and a second subscription with a subscrCond attribute value that identifies a target NF instance within the NF set, the first and second subscriptions include the same nfStatusNotificationUri, and the duplicate notification avoidance controller is configured to remove one of the first and second subscriptions from the list.

19. The system of claim 17 wherein the list includes a first subscription with a reqNotifEvents attribute value identifying an event and a second subscription without a reqNotifEvents attribute and concerning the same target NF as the first subscription, the first and second subscriptions include the same nfStatusNotificationUri, and the duplicate notification avoidance controller is configured to remove one of the first and second subscriptions from the list.

20. A non-transitory computer readable medium having stored thereon executable instructions that when executed by a processor of a computer control the computer to perform steps comprising:
   at a network function (NF) repository function (NRF):
      detecting an event relating to an NF;
      identifying a plurality of subscriptions having a subscription condition corresponding to the event;
      generating a list of the plurality of subscriptions having a subscription condition corresponding to the event;
      iterating through the list of subscriptions and identifying overlapping subscriptions;
      removing the overlapping subscriptions from the list; and
      sending notification messages to NFs corresponding to subscriptions remaining in the list.

* * * * *

UNITED STATES PATENT AND TRADEMARK OFFICE
CERTIFICATE OF CORRECTION

| | | |
|---|---|---|
| PATENT NO. | : 12,245,192 B2 | Page 1 of 1 |
| APPLICATION NO. | : 17/888022 | |
| DATED | : March 4, 2025 | |
| INVENTOR(S) | : Goel | |

It is certified that error appears in the above-identified patent and that said Letters Patent is hereby corrected as shown below:

In the Specifications

In Column 2, Line 10, delete "29,510," and insert -- 29.510, --, therefor.

In Column 2, Line 31, delete "in in" and insert -- in --, therefor.

In Column 6, Line 41, delete "(loT)" and insert -- (IoT) --, therefor.

In Column 7, Line 3, delete "In" and insert -- in --, therefor.

Signed and Sealed this
Third Day of June, 2025

Coke Morgan Stewart
*Acting Director of the United States Patent and Trademark Office*